(12) United States Patent
Beyah et al.

(10) Patent No.: US 9,225,732 B2
(45) Date of Patent: Dec. 29, 2015

(54) SYSTEMS AND METHODS FOR FINGERPRINTING PHYSICAL DEVICES AND DEVICE TYPES BASED ON NETWORK TRAFFIC

(71) Applicant: Georgia Tech Research Corporation, Atlanta, GA (US)

(72) Inventors: Abdul Raheem Beyah, Atlanta, GA (US); Cherita La'Quale Corbett, Rockville, MD (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 156 days.

(21) Appl. No.: 13/689,748

(22) Filed: Nov. 29, 2012

(65) Prior Publication Data

US 2013/0139263 A1    May 30, 2013

Related U.S. Application Data

(60) Provisional application No. 61/564,557, filed on Nov. 29, 2011.

(51) Int. Cl.
*G06F 11/00* (2006.01)
*H04L 29/06* (2006.01)

(52) U.S. Cl.
CPC .................... *H04L 63/1408* (2013.01)

(58) Field of Classification Search
CPC ..... G06F 21/554; G06F 21/56; G06F 21/561; G06F 21/564; G06F 21/552; H04L 12/2602; H04L 63/14; H04L 63/1408; H04L 63/1416; H04L 63/1425; H04L 63/1433; H04L 45/00

USPC ....................................... 726/22–25; 713/168
See application file for complete search history.

(56) References Cited

U.S. PATENT DOCUMENTS 5,365,514 A * 11/1994 Hershey .................. H04L 43/00
                                                                   340/3.21
6,240,463 B1 * 5/2001 Benmohamed ....... H04L 41/145
                                                                    370/238

(Continued)

OTHER PUBLICATIONS

Kohno, Tadayoshi et al., "Remote Physical Device Fingerprinting"; In SP '05: Proceedings of the 2005 IEEE Symposium on Security and Privacy, pp. 211-225.

(Continued)

*Primary Examiner* — Thu Ha Nguyen
(74) *Attorney, Agent, or Firm* — Troutman Sanders LLP; Ryan A. Schneider; Parker D. Hancock

(57) ABSTRACT

Systems and methods for providing device and/or device type fingerprinting based on properties of network traffic originating from a device to be identified. In one implementation, the method includes capturing packets routed through a network at an intermediate node between the originating device to be identified and destination, measuring properties of the captured traffic, including packet inter-arrival time, and generating a signature based on the measured properties that includes identifying information about the hardware and/or software architecture of the device. Various implementations do not require deep packet inspection, do not require a managed device-side client, are protocol and packet payload agnostic, and effective for MAC or IP-level encrypted streams. Also, various implementations can provide wired-side detection of wireless devices and device types and can detect both previously detected and unknown devices.

14 Claims, 10 Drawing Sheets

(56) References Cited

U.S. PATENT DOCUMENTS

| | | | | |
|---|---|---|---|---|
| 7,136,374 | B1* | 11/2006 | Kompella | H04L 45/10 370/352 |
| 7,743,415 | B2* | 6/2010 | Poletto | H04L 63/1408 726/23 |
| 7,961,636 | B1* | 6/2011 | Barach | H04L 12/4625 370/252 |
| 8,171,544 | B2* | 5/2012 | Black | H04L 45/00 726/22 |
| 8,259,727 | B2* | 9/2012 | Bennett | H04L 63/0227 370/392 |
| 8,705,526 | B1* | 4/2014 | Hasan | H04J 1/16 370/216 |
| 2006/0242701 | A1* | 10/2006 | Black | H04L 45/00 726/22 |
| 2007/0036072 | A1* | 2/2007 | Raj | H04L 45/00 370/225 |
| 2008/0025231 | A1* | 1/2008 | Sharma | H04L 41/12 370/252 |
| 2009/0323516 | A1* | 12/2009 | Bhagwan | H04L 41/0636 370/216 |
| 2010/0269177 | A1* | 10/2010 | Bennett | H04L 63/0227 726/22 |
| 2011/0277034 | A1* | 11/2011 | Hanson | H04L 63/1433 726/25 |
| 2012/0331553 | A1* | 12/2012 | Aziz | G06F 21/554 726/23 |

OTHER PUBLICATIONS

Bratus, Sergey et al., "Active Behavioral Fingerprinting of Wireless Devices", In WiSec '08: Proceedings of the first ACM Conference on Wireless Network Security, pp. 56-61.

Cache, Johnny et al., "Exploiting 802.11 Wireless Driver Vulnerabilities on Windows", Jan. 2009, pp. 2-39.

Corbett, Cherita et al., "A Passive Approach to Wireless NIC Identification", In Communications, 2006, ICC '06, IEEE Conference, vol. 5, pp. 2329-2334.

Corbett, Cherita et al., "Using Active Scanning to Identify Wireless NICs", Information Assurance Workshop, 2006, IEEE, pp. 239-246.

Corbett, Cherita et al., "Passive Classification of Wireless NICs During Active Scanning", International Journal of Information Security, 2008; pp. 335-348.

Corbett, Cherita et al., "Passivie Classification of Wireless NICs During Rate Switching", EURASIP J. Wireless Communication Network, 2008, pp. 1-12.

Feldmann, Anja et al., "Dynamics of IP Traffic: A Study of the Role of Variability and the Impact of Control", Sigcomm Computer Communication Rev., vol. 29(4), 1999, pp. 301-313.

Franklin, Jason et al., "Passive Data Link Layer 802.11 Wireless Device Driver Fingerprinting", USENIX-SS'06: Proceedings of the 15th Conference of USENIX Security Symposium, 2006, pp. 1-12.

Huang, Polly et al., "A Non-Intrusive, Wavelet-Based Approach to Detecting Network Performance Problems", 2001, pp. 213-227.

Jana, Suman et al., "On Fast and Accurate Detection of Unauthorized Wireless Access Points Using Clock Skews", MobiCom '08: Proceedings of the 14th CM International Conference on Mobile Computing and Networking, pp. 104-115.

Gao, Ke et al., "A Passive Approach to Wireless Device Fingerprinting", Dependable Systems and Networks (DSN), 2010 IEEE/IFIP International Conference.

Weeks, M., "Digital Signal Processing Using MATLAB and Wavelets", Infinity, 2007, pp. 1-478.

Beizer, Boris, "Functionally Effective Functional Testing of Software and Systems", Software, IEEE, vol. 13, No. 5, Sep. 1996.

* cited by examiner

SYSTEMS AND METHODS FOR FINGERPRINTING PHYSICAL DEVICES AND DEVICE TYPES BASED ON NETWORK TRAFFIC

CROSS-REFERENCE TO RELATED APPLICATIONS

This application claims priority and the benefit under 35 U.S.C. §119(e) of U.S. Provisional Patent Application No. 61/564,557, filed 29 Nov. 2011, the entire contents and substance of which are hereby incorporated by reference as if fully set forth below.

BACKGROUND

One of the most significant threats to the cyber infrastructure is from insiders who have valid user credentials, e.g., username and password, to access systems and networks. Traditionally, network administrators have invested in firewalls and network intrusion detection systems (NIDS) to secure the perimeter of the network in hopes of keeping an attacker out. However, these solutions do not stop attacks originating inside the network. And although host intrusion detection systems (HIDS) have been used to provide some defense against inside attacks, the provided defense is limited to devices for which there is a viable client application available (e.g., a compatible network access control (NAC) client), leaving many types of devices unmanaged and insecure. This leaves an opportunity for authorized insiders to insert unauthorized devices and unmanageable systems onto the network, possibly for data exfiltration. Given the significant threat from insiders, the security of a network cannot depend only on user authentication; rather all devices that access the network should have proper authorization independent of user authorization.

To enable device-level authorization, robust techniques are needed for uniquely identifying, or fingerprinting, devices and device-types on a network. Traditional techniques like using Internet Protocol (IP) addresses or medium access control (MAC) addresses are insufficient because these identifiers can easily be changed, or "spoofed." More recently developed techniques have improved on device and device-type fingerprinting, but these conventional techniques still suffer from several critical shortcomings. For example, many of these techniques are limited to fingerprinting only devices of certain device types, e.g., able to differentiate only between types of wireless access points (APs); are communications protocol specific, e.g., dependent on a particular feature of a target protocol to identify a device; or require actively probing the device to be identified, e.g., by sending malformed packets that can potentially alert the target device to the ID process. Other conventional techniques require physical possession or close proximity to the device to be identified, e.g., within RF range of the device; or require expensive signal-analyzer hardware to be effective. Moreover, conventional fingerprinting techniques are generally suitable only for either fingerprinting a device or fingerprinting a device type, but cannot be used to discern both pieces of information.

SUMMARY

Some or all of the above needs may be addressed by certain implementations of the disclosed technology. Certain implementations may include analyzing network traffic originating from a device and generating a signature comprising encoded information about the hardware and software architecture of the device.

According to an example implementation, a method is provided. The method may include capturing network traffic originating from a first device and routed to a destination node. The network traffic may be captured at a listening node. The first device, destination node, and listening node may each be in communication with a first network. The method may further include measuring one or more traffic properties of the captured network traffic. The method may yet further include generating a feature vector based on at least a portion of the one or more measured traffic properties. The method may also include analyzing one or more statistical properties of the feature vector and generating a first device signature based on the analyzed one or more statistical properties. The first device signature may comprise encoded information about the hardware and software architecture of the first device.

According to another example implementation, a computer-readable medium is provided. The computer-readable medium may include instructions that, when executed by at least one processor in a system, cause the system to perform a method. The method may include receiving packets originating from a first device and routed to a destination node. The packets may be received at a listening node. The first device, destination node, and listening node may each be in communication with a first network. The method may further include determining one or more traffic properties of the packets. The method may yet further include generating a feature vector based on at least a portion of the one or more determined traffic properties. The method may also include analyzing one or more statistical properties of the feature vector and generating a first device signature based on the analyzed one or more statistical properties. The first device signature may comprise encoded information about the hardware and software architecture of the first device.

According to yet another example implementation, a method is provided. The method may include passively capturing network traffic originating from a first device, the network traffic routed over a wired segment to arrive at a destination node. The first device, destination node, and listening node may each be in communication with a first network. The network traffic may be captured by the listening node from the wired segment. The method may further include measuring packet inter-arrival times of the captured network traffic. The method may yet further include generating a feature vector based on at least the measured packet inter-arrival times and analyzing one or more statistical properties of the feature vector. The method may also include generating a first device signature based on the analyzed one or more statistical properties. The first device signature may comprise encoded information about the hardware and software architecture of the first device. The method may still yet further include comparing the first device signature with one or more known signatures. Also, the method may include determining a type of the first device and an identity of the first device. The determining may be based on the comparing the first device signature with one or more known signatures.

Other implementations, features, and aspects of the disclosed technology are described in detail herein and are considered a part of the claimed disclosed technology. Other implementations, features, and aspects may be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
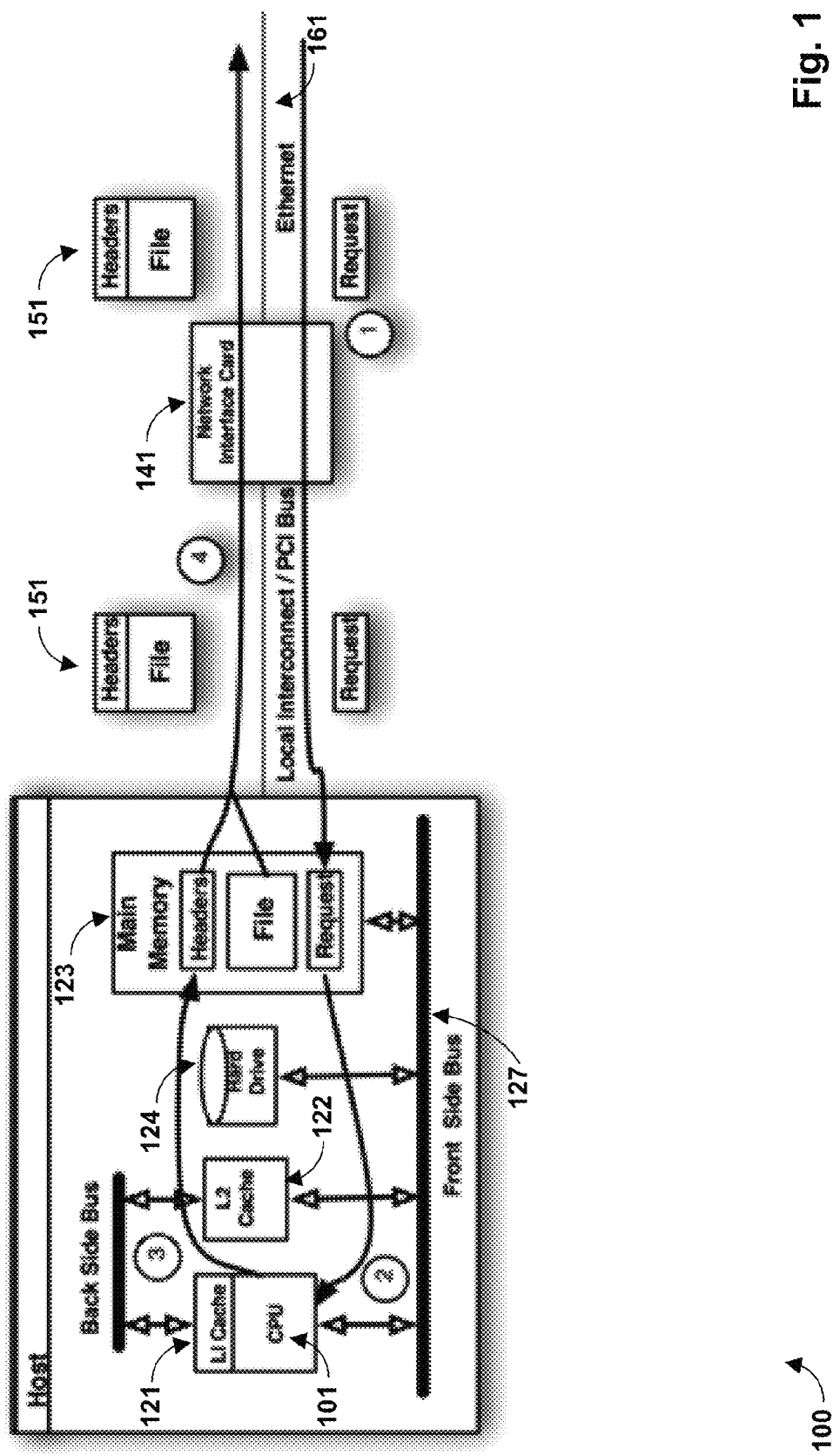
FIG. 1 depicts an illustration of a block diagram of an example device hardware architecture, according to an example implementation.

To facilitate an understanding of the principles and features of implementations of the disclosed technology, various example implementations are explained below. Although example implementations of the disclosed technology are explained in detail, other implementations are contemplated. Further, in describing the example implementations, specific terminology will be resorted to for the sake of clarity. It is not intended that the disclosed technology be limited in scope to the details of construction and arrangement of components set forth in the following description or illustrated in the drawings. Rather, the disclosed technology is capable of other implementations and of being practiced or carried out in various ways.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to.

The behavior of packets on a network is at least partially determined by the hardware that generated the packets. This generating hardware may be unique, due to the diverse set of device compositions, component manufacturers, and physical differences arising from inherent variability of wire delays and parasitic gate delays in manufactured circuits, and clock skew. Moreover, fundamental variability in the fabrication process in manufactured circuits ensures that even chips produced in the same fabrication batch are different on some level. As information about the internal hardware of a device leaks into network traffic through packet behavior, some implementations of the disclosed technology can leverage this leakage vector to determine the unique identity of the device or the device's type.

Analyzing network packet behavior to determine device identity is related to the process of speaker identification. Just as the hardware that generates packets influences packet behavior on a network, human anatomy (e.g., size and shape of the throat and mouth) and speech behavior (e.g., voice pitch, speaking style) create acoustic features of speech that have been found to differ between individuals. This results in unique acoustic patterns and correspondingly unique voices. Researchers have leveraged voice uniqueness as a biometric identifier, creating the field of speaker recognition.

Speaker recognition for speaker identification may comprise the following: an unknown speaker vocalizes a speech utterance on which the system has been trained. Next, the system uses signal processing techniques to extract unique features from the voice signal. These techniques may vary in complexity since "normal" human speech can vary (e.g., tone, pitch, volume). The features are used as input to a classifier that intelligently acts upon the feature set and compares the current feature set with speech models of known speakers. The unknown speaker is identified as the speaker whose model best matches the input utterance or is flagged if there is no match.

Some implementations of the disclosed technology may be considered to perform a type of speaker recognition for networked nodes where the node transmits a digital utterance (e.g., a file or response to network probes) and the node is then classified as either authorized or unauthorized based on the features, i.e., corresponding hardware signature, of the digital utterance.

This side-channel approach has numerous benefits over conventional device identification techniques that rely on cryptographic information generated by software clients, e.g., NAC clients, to identify a host device. For example, as some implementations of the disclosed technology do not require device-side software clients to be installed, these implementations may be used to identify current and future unmanageable devices. Given the plethora of operating systems (OS), including OSes for seemingly benign devices such as printers, thermostats, cameras, etc., it is unlikely that NAC clients will be developed to enforce endpoint integrity for all IP-enabled network devices. Thus, these implementations may be used to identify a wide range of devices, independent of the device OS, that will remain unsecured and unidentifiable by conventional client-software-based NAC techniques.

Although other non-client-based device and device-type fingerprinting techniques have been developed, these conventional techniques are generally limited in they can be used either to fingerprint only devices or device types, but not both. However, there are situations where having the ability to effectively fingerprint both devices and device types using the same technique is beneficial. For example, the ability to perform device identification and device-type identification enables multi-level intrusion detection.

In a computing environment that is substantially homogenous, the detection of a fingerprint that is not of a certain type implies an intrusion. Since this determination may only require the comparison of the signature from the observed traffic to one known signature (that of the authorized type), fingerprinting new devices can be quicker and more efficient than if unique device identification was required, which may include comparing the input signature with signatures for every authorized device in the database. However, if an attacker uses a device of the same type authorized for use on the network to infiltrate the network, then a technique for identifying unique devices may be necessary to detect the intrusion. Accordingly, a single technique capable of performing both identifications may provide protection in both scenarios.

Another beneficial use of a technique that provides both device and device type fingerprinting is to enable both offensive and defensive capabilities with the same technique. In a scenario involving an institution with a substantially heterogeneous network, the ability to uniquely identify devices may be required to detect unauthorized nodes that have entered the network. However, this same institution may have interest in launching targeted attacks against other entities, potentially based on information gleaned from previously detected intrusion. Therefore, understanding the type of device (which may imply the OS and/or hardware configuration) in preparation for an attack may be beneficial.

In addition to enabling a technique capable of fingerprinting both devices and device types based on the same network traffic, some implementations of the disclosed technology may also provide at least the following benefits over other non-client-based device and device-type fingerprinting techniques:
- extensibility to any networked device, both wired and wireless;
- protocol independence, i.e., implementations work for TCP, UDP, ICMP, etc., and for the applications that they transport;
- effective identification of devices sending encrypted network traffic, including IP-level and MAC-level encrypted traffic streams;
- wired-side detection of wireless devices and device types;
- differentiation between distinct unknown devices;
- no deep packet inspection (DPI) required (e.g., inspecting timestamps, or protocol banners), thus preserving scalability without compromising privacy;
- no physical possession required or close proximity to the identified device; and
- resilience to various attacker types, as exploiting leaked hardware information makes it difficult for devices to simulate or masquerade as other devices and device types.

Referring now to the figures, in which like reference numerals represent like parts throughout the views, various implementations of the disclosed technology will be described in detail.

FIG. 1 depicts an illustration of a block diagram of an example device hardware architecture, according to an example implementation. Device packet creation can be a complex process that involves many internal parts of a network device, or node, working in concert. In an example device, before a packet 151 can be sent, the instruction set that initiates the process may be extracted from the memory hierarchy (L1 cache 121/L2 cache 122, main memory 123, hard disk 124) and sent to the CPU 101 for execution. The OS may then direct the CPU to create a buffer descriptor in main memory, which contains the starting memory address and length of the packet that is to be sent. Multiple buffer descriptors may be created if the packet consists of multiple discontiguous regions of memory. The OS may then direct the CPU to write information about the new buffer descriptors to a memory-mapped register on the network interface card (NIC) 141. These data may traverse the front side bus 127 through the Northbridge to the PCI bus 131. The NIC may initiate one or more direct memory access (DMA) transfer(s) to retrieve the descriptors. Then, the NIC may initiate one or more DMA transfer(s) to move the actual packet data from the main memory into its transmit buffer using the address and length information in the buffer descriptors. These data may again leave the front side bus, and travel to the NIC through the Northbridge and the PCI bus. Finally, the NIC may inform the OS and CPU that the descriptor has been processed. Then, the NIC may send the packet out onto the network 161 through its medium access control (MAC) unit.

Assuming that the effect of the OS may be abstracted, it becomes apparent that the major components affecting the creation of packets 151 include: the CPU 101, L1 cache 121/L2 cache 122, physical memory 123, the direct memory access (DMA) controller, the front side bus 127, the back side bus, the PCI bus 131, and the NIC 141. Opportunities for diversity occur both at the device level and at the component level. At the device level, different vendors may use different components with different capabilities and algorithms (e.g., Dell™ Latitude 2110 with Intel® Atom N470 processor @ 1.83 GHz vs. Lenovo® G570 with Intel Core™ i5-2430 processor@ 2.4 GHz) to create a device's internal architecture. Accordingly, the packet creation process may vary across architectures. At the component level, the inherent variability of wire delays parasitic gate delays, device clock skew, and the fundamental variability in the fabrication process in manufactured circuits may help to make the packet creation process unique. The architecture variations may enable device type identification while the component level variations may enable device identification.

Figure 2:
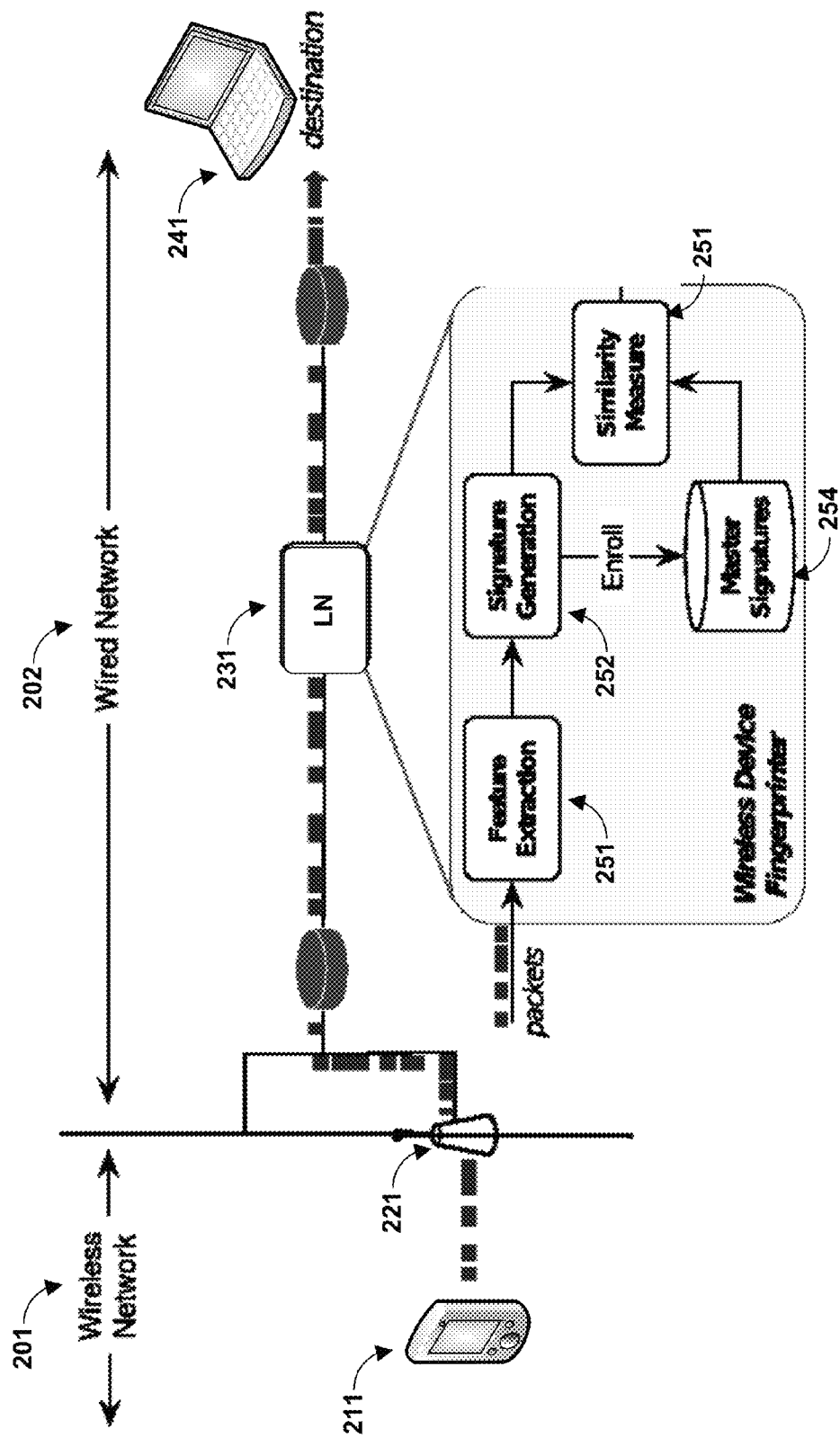
FIG. 2 depicts an illustration of a block diagram of an example network topology, according to an example implementation.

FIG. 2 depicts an illustration of a block diagram of an example network topology, according to an example implementation. As shown in FIG. 2A, a network 200 may comprise one or more wired 202 and/or wireless portions 201. A target device 211 or originating node in communication with the network may wirelessly transmit data over the air to an access point (AP) 221. The AP may forward data over its wired interface towards the final destination 241. A listening node 231 may be configured to collect, capture, or receive network traffic routed on a wired segment between the AP and the final destination to identify the type of wireless device. In some implementations, an Ethernet tap 271, the like, or another device, may be used to facilitate the "sniffing" of traffic. In another implementation, the listening node may be positioned to receive wireless signals from the target device.

Various other network topologies are possible and considered within the scope of this disclosure. For example, in some implementations, the target device 211 may be in wireless and/or wired communication with the network. Likewise, the listening node 231 or destination node 241 may also be in wireless and/or wired communication with the network. The network can be completely or substantially wired, wireless, or heterogeneous. Moreover, the destination node need not be the final intended destination of a packet 151. In an example implementation, the destination node may simply be a node one or more "hops" from the target device. Also, in some implementations, the target device 211 or originating node may represent one or more devices associated with, contained in, or in communication with the target device. In one example implementation, the listening node may also be the destination node. Other suitable network topologies for use with the disclosed technology will be apparent to one of skill in the art.

As shown in FIG. 2B, in some implementations, the listening node may be configured to perform additional functions. For example, the listening node may also be configured to perform one or more of feature extraction, signature generation, and similarity measure, and may comprise corresponding components 251, 252, 253 or software/hardware modules for these processes. However, other parts of the system may also be configured to perform these process. In another example implementation, the listening node may be in communication with one or more discrete nodes or devices configured to perform one or more of these, or other parts, of the technique disclosed herein.

With reference to an example implementation, feature extraction, signature generation, and similarity measure will now be described in detail.

Feature Extraction:

In some implementations, a feature extraction process may measure, determine, or record one or more traffic properties, or features, as network traffic is collected. The selected feature(s) for measurement should preserve the information pertinent to the type of device and capture discriminating properties for successful classification. For the example implementation described herein, packet inter-arrival time (IAT) is the measured feature. The use of other measurements, either alone, or in combination, including, without limitation, packet round-trip-time (RTT) and packet size are considered within the scope of this disclosure.

IAT measures the delay ($\delta t$) between successive packets. Importantly, IAT characterizes packet behavior (e.g., traffic rate) independent of the data, or "payload" being transported by the packets. Thus, using IAT and other behavioral packet properties affords the disclosed technique great flexibility in that some implementations may be packet agnostic. Accordingly, these implementations may be used to effectively analyze encrypted network traffic, independent of type or protocol, and without the need for deep packet inspection (DPI) or prior knowledge about packet payload.

In some implementations, the traffic properties may be measured successively in time and structured as a feature vector. The resulting feature vector may be a time series of values for passage passed to a signature generation process for analysis. In this example, the IAT feature vector may be represented as:

$$f=(\Delta t_1, \Delta t_2, \Delta t_3, \ldots, \Delta t_i), \quad (1)$$

where $\Delta t_i$ is the inter-arrival time between packet i and i−1, and the first collected packet is i=0.

Signature Generation:

In some implementations, the signature generation process may use statistical analysis to reveal identifying patterns embedded in the traffic measurements. The resulting signature may be used to fingerprint the device or device type for later detection or comparison.

In this example, a time-domain method for signature generation is described. However, various other statistical analysis techniques may be used and are considered within the scope of this disclosure. For example, and not limitation, additional suitable statistical analysis techniques include using neural networks, singular value decomposition, wavelets, etc. Other suitable statistical analysis techniques will be apparent to one of skill in the art.

The time-domain method described herein is applied to the distribution of the IAT feature vector. Distributions may capture the frequency density of events over discrete intervals of time. Due to the periodic nature of network traffic, distributions can be a useful tool for traffic analysis.

In this example, the number of measured IAT values falling within bins of an equal-sized interval of time is counted. The frequency count is divided by the total number of IAT values to produce the probability distribution, p for each bin. The average IAT, $\mu$, is calculated for each bin. The interval of time for a bin, or its bin width, may be represented so the edges of the interval for the n th bin are (binctrn−binwidth/2) and (binctrn+binwidth/2), where binctr is the center of the bin. Finally, the signature, ($\Omega$), or fingerprint of a device may be defined as:

$$\Omega(f)=\{binctr, p, \mu\}, \quad (2)$$

where, binctr is the center of the n th bin, p is probability distribution of the n th bin, and $\mu$ is average IAT of the n th bin.

The device signature may be sensitive to the bin width and different bin widths may reveal different information about the feature vector. Smaller bin widths may cause fewer IAT values to occur within a particular bin, and what may appear to be meaningful information may really be due to random variations in the traffic rate. Conversely, larger bin widths may omit important information, aggregating information that might otherwise help to discriminate between two different devices into fewer bins. Although not required, the bin width may be selected at least partially based on a specific or anticipated traffic type or protocol (e.g., TCP, UDP) in order to create a better signature representing the traffic and device.

In some implementations, signatures for known devices may be generated and stored in a master signature database 254. As traffic arrives from an unknown source, a sample signature for the new unknown device may be generated and compared with signatures in the master signature database to identify the source.

Similarity Measure:

Once signatures have been generated, a similarity measure may be used to compare an unknown signature with another signature. Various methods for determining the closeness of signal data are known in the art and not described at length herein. In this example, the following distance measure is used calculate the similarity between an unknown signature and a master signature:

$$D(x, y) = \sum_{n=1}^{N} \{|p_x(n) - p_y(n)| + p_y(n) * |\mu_x(n) - \mu_y(n)|\}, \quad (3)$$

where N is the maximum number of bins between $\Omega_x$ and $\Omega_y$. After comparing the unknown signature $\Omega_x$ with all the master signatures $\Omega_y = \{\Omega_1, \Omega_2, \Omega_3, \ldots\}$, the $\Omega_y$ that produces a distance, D(x, y), closest to zero is presumed the identity of the unknown device. D(x, y) is essentially a value of closeness to a master signature representing a known device.

Example Implementations

Figure 7:
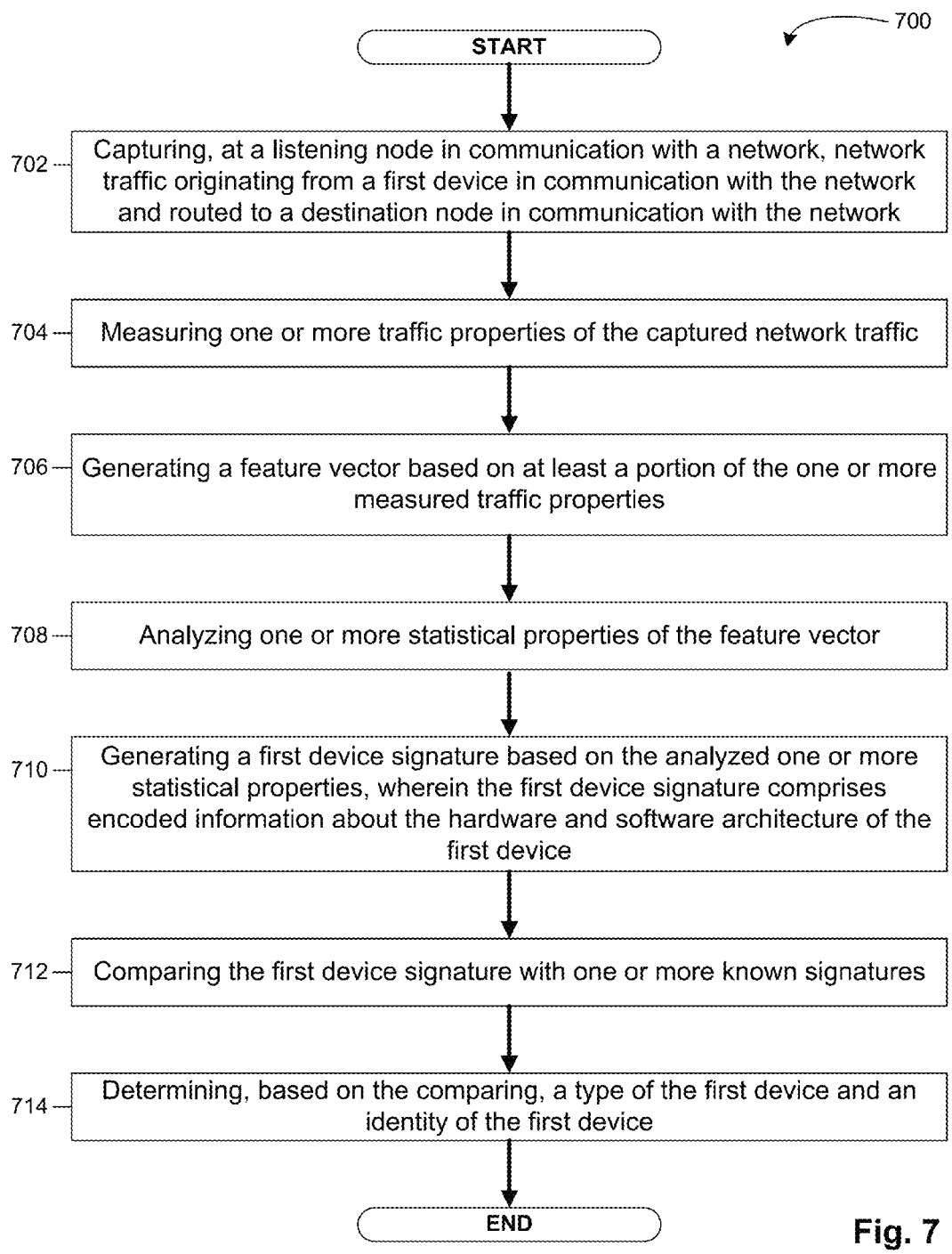
FIG. 7 depicts a flow diagram of the method, according to an example implementation.

An example method 700 for generating a device signature will now be described with reference to the flow diagram of FIG. 7. The method 700 starts in block 702, and according to an example implementation, includes capturing, at a listening node in communication with a network, network traffic originating from a first device in communication with the network and routed to a destination node in communication with the network. In block 704, the method 700 includes measuring one or more traffic properties of the captured network traffic. In block 706, the method 700 includes generating a feature vector based on at least a portion of the one or more measured traffic properties. In block 708, the method 700 includes analyzing one or more statistical properties of the feature vector. In block 710, the method 700 includes generating a first device signature based on the analyzed one or more statistical properties, wherein the first device signature comprises encoded information about the hardware and software architecture of the first device. According to a further implementation, the method continues in block 712 further includes comparing the first device signature with one or more known signatures. In block 714, the method 700 includes determining, based on the comparing, a type of the first device and an identity of the first device.

As explained previously, some implementations of the disclosed technology may compare a signature generated for a device in question with previously collected master signatures in order to identify the device in question and/or its type. For instance, an example implementation may include a collection of master signatures for two identical model Android™ Phones. In this case, there will be two master device IDs (Android-Phone#1 and Android-Phone#2) and one device type (Android-Phone). Hence, given a set of master signatures, there would be three applicable outcomes in identifying a device and its type. In the first outcome, the implementation successfully recognizes the unknown device and its device type because the samples from the unknown device match either one of the master signatures of a device or master signatures of a device type in the signature database. In the second outcome, the implementation is not able to find a match for a given device and device type in the signature database. Therefore, in this case, the sample device may be classified as an unknown device. The third outcome represents a case between the first two outcomes as the implementation is able to identify the device's type, but not the actual device associated with the tested device.

An example algorithm for comparing device signatures is presented below:

```
1: Identify - ID - Type( )
2: begin
3:    Ω_y,N_y,ID_y,Type_y ← FetchMasters( )
4:    Ω_x,N_x ← CreateSamples( )
5:    for i = 1;i <= N_x;i + + do
6:       for j = 1;j <= N_y;j + + do
7:          D(x,y)_j ← MeasureSimilarity(Ω_y^j, Ω_x^i)
8:       end for
9:       X,j ← Min(D(x,y))
10:      ID_m,Type_m ← ID_y(j),Type_y(j)
11:      X3 ← TP(ID_m)
12:      X1,X2 ← TP(Type_m)
13:      if (X1 <= X <= X3) then
14:         ID = ID_m
15:         Type = Type_m
16:      else
17:         ID = U //ID is unknown
18:         if (X1 <= X <= X2) then
19:            Type = Type_m
20:         else
21:            Type = U //Type is unknown
22:         end if
23:      end if
24:   end for
25:   return ID,Type
26: end
```

The example algorithm first measures the similarity of the sample unknown device (lines 6-8). After comparing a sample with all the master signatures, the minimum similarity (closeness) value (X) is determined (lines 9-10). Then, the logic verifies if X is indeed within the distribution of similarity values that resulted in True Positive (TP) classifications for previous devices compared to this device master signature and device type master signature. For this, the logic compares X with X1, X2, X3 where X1 and X2 refer to the 10th and 90th percentile of the device type TP values and X3 is the 90th percentile of the device TP values associated with the identified master (lines 13-21). If these conditions are met, the device and/or type are identified. Otherwise, it is labeled as unknown, or True Negative (TN) (i.e., not previously seen).

Figure 3:
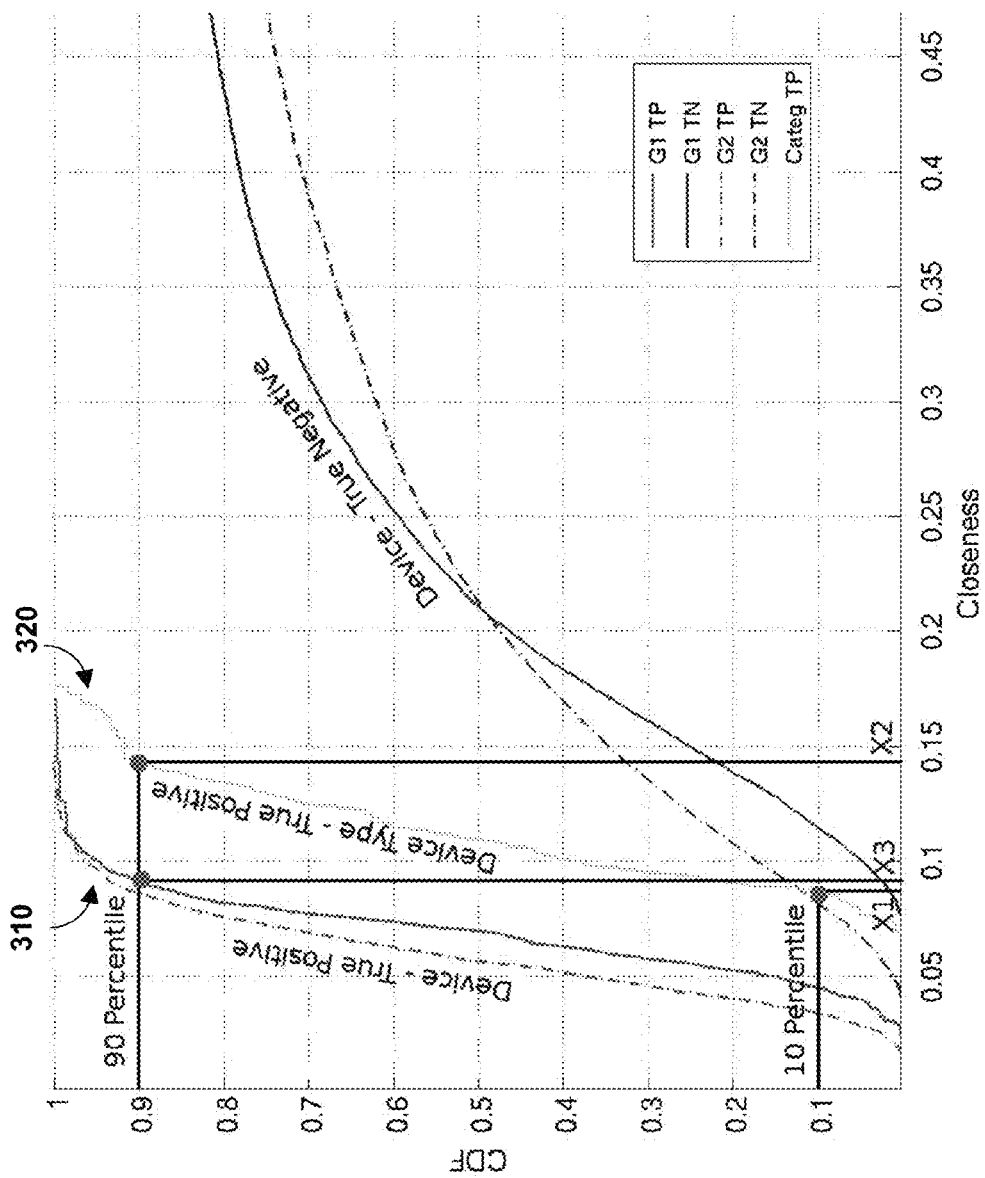
FIG. 3 depicts an illustration of a plot of closeness value against cumulative density function for an example device transmitting UDP traffic, according to an example implementation.

FIG. 3 depicts an illustration of a plot of closeness value against cumulative density function for an example device transmitting UDP traffic, according to an example implementation. FIG. 3 provides a visual of sample empirical distributions used to perform this analysis. Note that the similarity measurement data for device type and device TP values, which are used to determine the values of X1, X2, and X3 may be obtained using a separate dataset, resulting in a database of TP values for previously seen devices and device types. Thus, an example implementation may check to see if the closeness value fits the historic TP distributions of current master signatures to determine whether a device is classified as unknown. The difference between the device TP 310 and the device type TP 320 distributions is due to heterogeneity of the different hardware composition (e.g., processor, DMA controller, memory) of the devices as well as the intrinsic variation in the chip fabrication process. Therefore, in an example implementation, a tested device may be first expected to be closest to its own signature (Device-TP), then closest to its type signature (Device Type-TP), then to other devices (Device-TN), assuming the existence of a match for the signature of the tested device.

Experimental Results

Figure 4A:
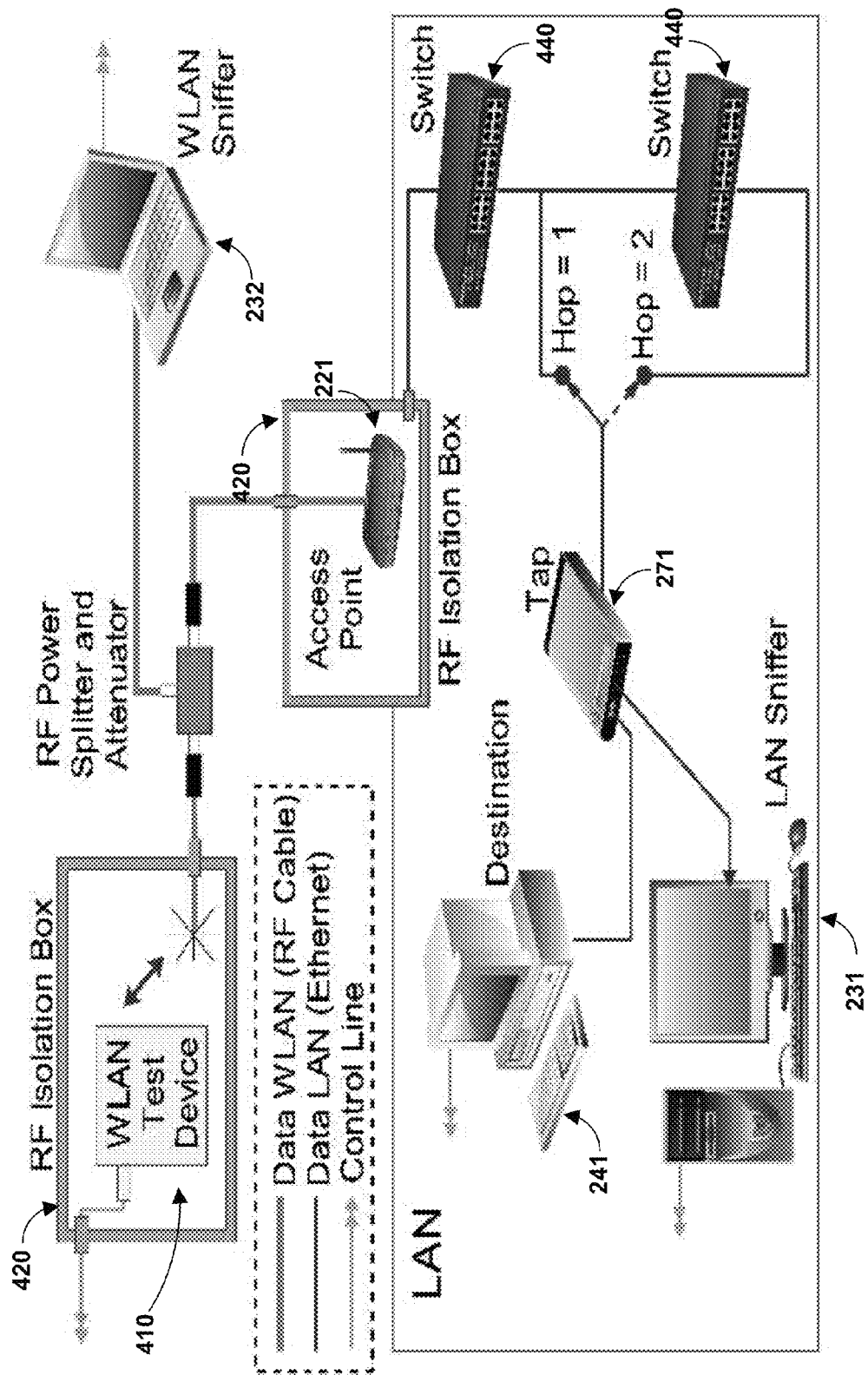
FIG. 4A depicts an illustration of a block diagram of an example isolated network topology, according to an example implementation.
Figure 4B:
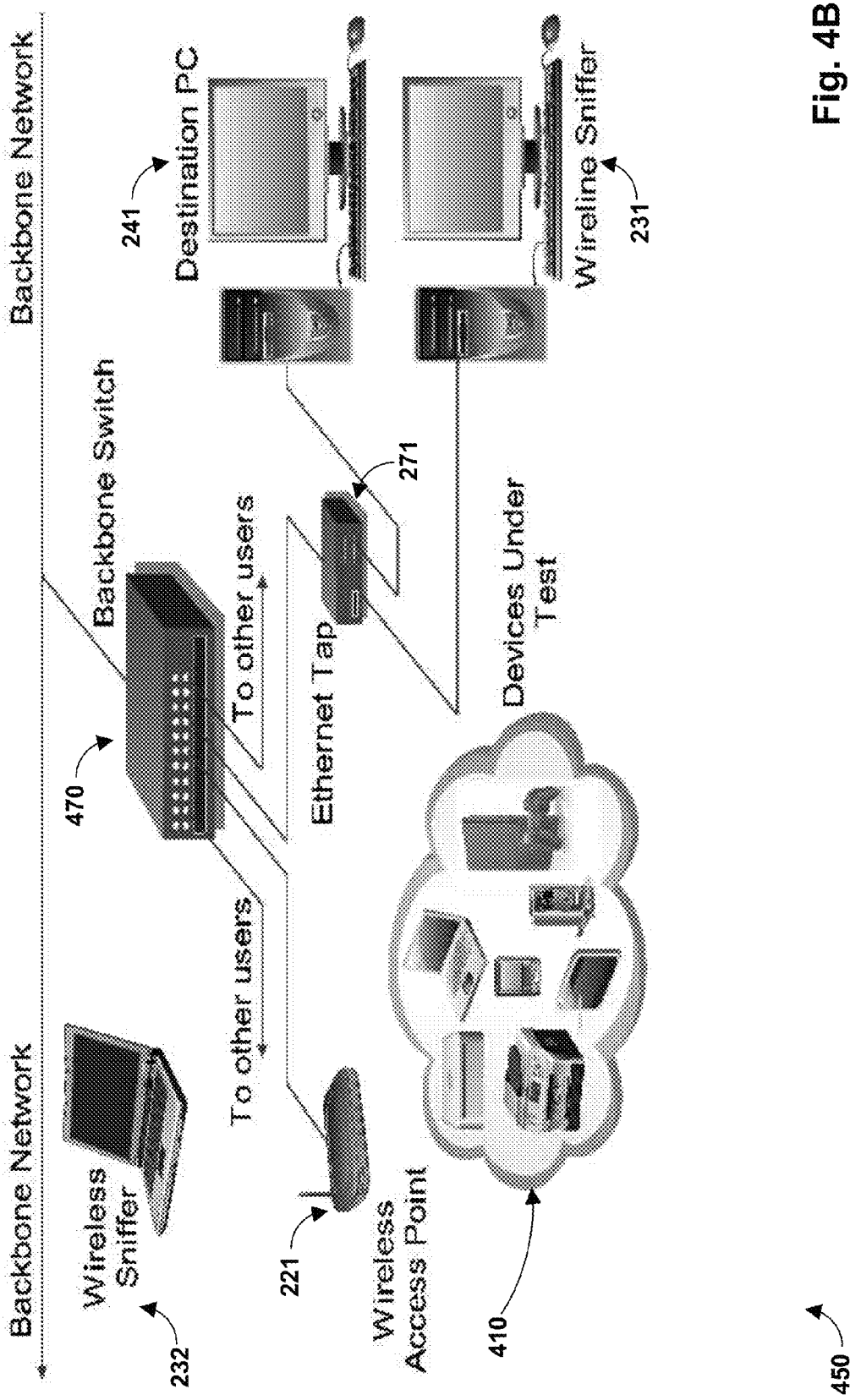
FIG. 4B depicts an illustration of a block diagram of an example campus network topology, according to an example implementation.

The performance of an example implementation of the disclosed technology was evaluated across three dimensions. First, the technique was analyzed in an isolated network environment, as shown in FIG. 4A. Second, the performance was measured in in a live campus network, as shown in FIG. 4B, during peak hours. Third, the effectiveness of the technique was analyzed while under various attack scenarios in a live network.

Performance Metrics:

The performance of an example implementation was measured using accuracy and recall. Accuracy was defined as:

$$\alpha = \frac{TP + TN}{TP + TN + FP + FN}, \tag{4}$$

where TP, TN, FP, and FN refer to True Positive, True Negative, False Positive, and False Negative, respectively. With accuracy, overall performance of the system is measured. Recall is the measure of identifying an actual device and is statistically defined as:

$$\gamma = \frac{TP}{TP + FN}. \tag{5}$$

Both accuracy and recall were used because the sole usage of accuracy is misleading when analyzing certain types of test cases (e.g., for test cases that do not allow the entire cohort to contribute to all of the statistics). This is because accuracy, as shown in Equation 4, requires statistics from the entire cohort of devices (i.e., TNs). This information may not be available for certain experiments (i.e., different protocols on one device). Hence, recall makes the evaluation independent of the impact of other TNs and yields a realistic performance focused only on TPs. Nonetheless, accuracy is still useful, for instance, in analyzing the behavior across different traffic types of the entire cohort. Thus, in the Performance Evaluation Section, accuracy is only populated where appropriate.

Testbed Setups:

Two automated testbeds were assembled to transmit and record traffic from the wireless devices to a wired segment and vice versa. In the isolated testbed 400, as shown in FIG. 4A, a control machine (not shown) was used to send commands to the different devices in the testbed for single- and multiple-hop scenarios. The device under test 410 was placed in an isolation box 420 to reduce RF leakage and interference. The isolated testbed also included one or more switches 440, a LAN sniffer (i.e., wired listening node 231), a WLAN sniffer (i.e. wireless listening node 232), an access point 221 inside another isolation box, and an ethernet tap 271.

For the real network testbed 450, as shown in FIG. 4B, the AP 221 and local area network (LAN) destination 241 were connected to a campus backbone switch 470 to test the technique with real MAC and physical layer interference from other wireless users in proximity, during peak hours. A total of 30 different devices (14 in the isolated testbed and 16 in the real network testbed) were tested and their details are listed in Table I and Table II, respectively.

Traffic & Signature Generation:

Two generic applications were used to generate traffic in the testbeds. One was Iperf, which was used to generate both TCP and UDP traffic at controlled rates, and the other was Ping. In addition to these applications, tests were performed using other applications such as secure copy (SCP) and Skype. Each experiment generated approximately one hour of traffic. This resulted in 30 hours of traffic used to evaluate an example implementation. The initial portion of the captured traffic (depending on the size of the master) was used for generating the master signatures. The remaining portion was split into two equal halves, out of which the first half was used for training and the second half was used for analysis. Specifically, 10 different master $\{1, 2.5, 5, 7.5, 10, 20, 30, 50, 75, 100\} \times 10^3$ and 20 different sample signature sizes $\{1, 2.5, 5, 7.5, 10, 15, 20, 25, 30, 35, 40, 45, 50, 55, \ldots, 100\} \times 10^3$ were used in the experiments.

Figure 5A:
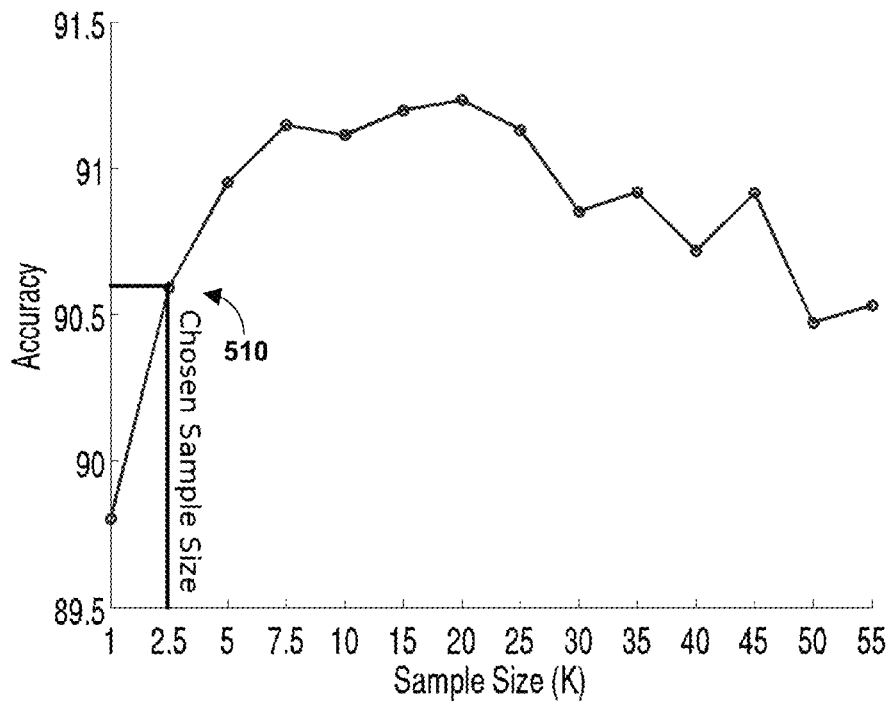
FIG. 5A depicts a plot of master size against accuracy for experimental results, according to an example implementation.
Figure 5B:
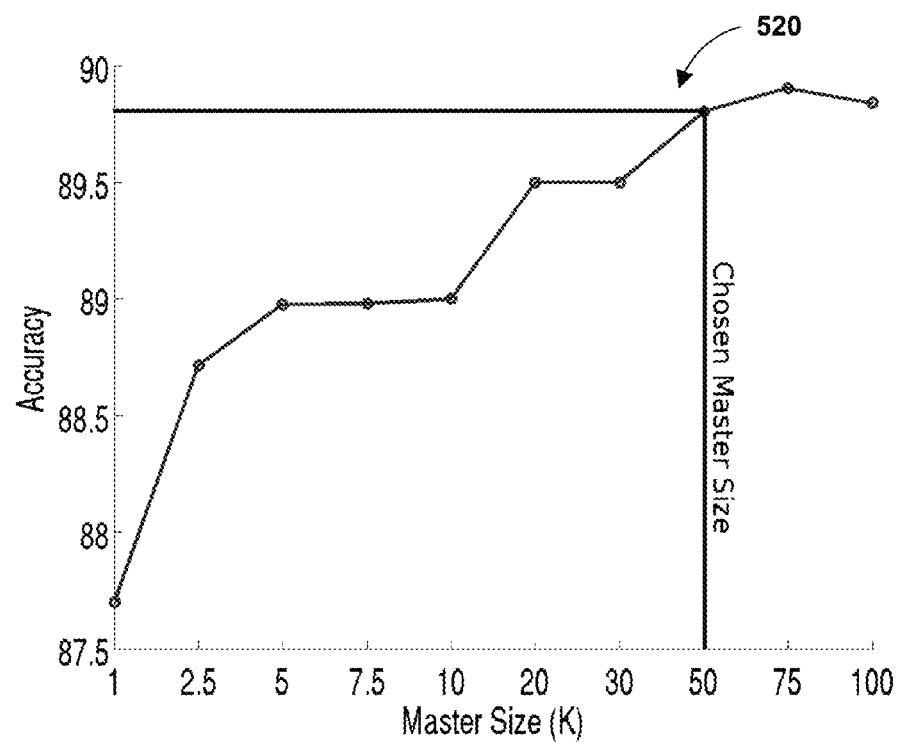
FIG. 5B depicts a plot of sample size against accuracy for experimental results, according to an example implementation.

FIG. 5A depicts a plot of master size against accuracy for experimental results, according to an example implementation. FIG. 5B depicts a plot of sample size against accuracy for experimental results, according to an example implementation. The best master and sample sizes for the overall performance of the example implementation were empirically determined to be 50K (see FIG. 5B, 520) and 2.5K (see FIG. 5A, 510), respectively. Thus, these signature sizes were used throughout the rest of the experiments.

TABLE I

| Device | Device ID | Model | Hardware Specification | Operating System | Kernel |
|---|---|---|---|---|---|
| Netbook | Dell 1<br>Dell 2<br>Dell 3<br>Dell 4<br>Dell 5 | DELL<br>Latitude 2110 | Intel Atom N470<br>@ 1.83 GHz 1 GB RAM | Ubuntu 10.04.1 LTS/<br>Windows XP | Kernel 2.6.32.24 -<br>generic |
| Nokia | Nokia 1<br>Nokia 2 | N900 | ARMv7 rev 3 (v71)<br>@ 600 MHz 256 MB RAM | Maemo 5, Version<br>3.2010.02.8 | Kernel 2.6.28 -<br>omap1 |
| iPhone3G | iPhone3G 1<br>iPhone3G 2 | MB715LL (A1303) | A4 processor @ 1 GHz<br>512 MB cDRAM | iOS 4.0 (BA293) | Kernel 10.3.1 |
| iPhone4G | iPhone4G 1<br>iPhone4G 2 | MC608LL (A1332) | A4 processor @ 1 GHz<br>512 MB cDRAM | iOS 4.3.3 (B12) | Kernel 11.0.0/<br>Firmware 04.10.01 |
| iPad | iPad 1<br>iPad 2<br>iPad 3 | MC497LL | A4 processor @ 1 GHz<br>256 MB DDR RAM | iOS 4.3.5<br>iOS 3.2.2<br>iOS 3.2.2 | Kernel 10.3.1 |

TABLE II

| Device | Device ID | Model | Hardware Specification | Operating System | Kernel |
|---|---|---|---|---|---|
| Lenovo | L1<br>L2 | Lenovo G570 | 2.4 GHz Intel Core 15-2430M<br>4 GB RAM | Ubuntu 11.04 (64 bit)/<br>Windows 7 (64 bit) | Linux 2.6.38 - 13 -<br>generic |
| Dell | D1<br>D2 | Dell Probook 4350a | 2.4 GHz Intel Core 15-2430M<br>4 GB RAM | Ubuntu 11.04 (64 bit)/<br>Windows 7 (64 bit) | Linux 2.6.38 - 13 -<br>generic |
| ASUS Tablet | T1<br>T2 | ASUS Transformer<br>TF 101 | 1.0 GHz NVIDIA Tegra 2<br>dual-core CPU 1 GB RAM | Android 3.2.1 | Kernel 2.6.36.3 |
| Google Nexus One | G1<br>G2 | Nexus One | 1 GHz Qualcomm QSD8250<br>Processor 512 MB RAM | Android 2.2 | Kernel 2.6.32.9<br>Kernel 2.6.29 |
| Kindle Fire | K1<br>K2 | Kindle Fire | 1 GHz Texas Instruments OMAP<br>4430 dual-core processor 512 MB RAM | Customized Android 2.3 | Firmware 6.2.2<br>Firmware 6.2.1 |
| Apple TV | A1<br>A2 | ATV 1st Gen | Intel Pentium M processor<br>256 MB DDR2 RAM @400 MHz | OS Version 2.0<br>based on MAC OS X | — |
| HP Printer | H1<br>H2 | HP Officejet<br>6500A Plus | — | RTOS | — |
| D-Link<br>IP-Camera | C1<br>C2 | D-Link DSC 932L | — | RTOS | — |
| PS3 | P1<br>P2 | CHCH-3001A | CPU Cell Processor PowerPC-base Core<br>@3.2 GHz CPU RSX @550 MHz<br>256 MB XDR Main RAM @3.2 GHz<br>256 MB GDDR3 VRAM @700 MHz | XrossMediaBar | Firmware Version 3.72 |

Isolated Testbed Results:

An example implementation may operate in two modes: known and unknown. The known mode refers to a case where an example implementation attempts to recognize a previously seen device among other previously seen devices and therefore, has a master signature associated with the device in question. Thus, in this case, the example implementation may either correctly identify the device and the device type, or mis-identify them. In the unknown mode of test, the example implementation was exposed to both devices it has previously seen and devices that it has not previously seen. Thus, in this case, the example implementation may not have the necessary master signature associated with a sample device tested. As a result, if the example implementation did not recognize a device, it then identified it as an unknown device, otherwise it identified the type and/or the device.

The two different modes may work best for different scenarios. For example, in a benign network, the known mode, which may have better accuracy and recall, can be used for inventory control. However, in a network where access control is a concern, the unknown mode may be superior.

Using the accuracy ($\alpha$) and recall ($\gamma$) metrics, the overall effectiveness of the technique was measured for both modes. For queuing, two scenarios were tested in the isolated network testbed: Single-hop and multi-hop with the results summarized in Table III. For the single-hop case, the device with the maximum $\gamma$ was Netbook#5 with 99% while the device with the minimum $\gamma$ was iPhone4#2 with 56% and the average was 78% for the device identification analysis in the known analysis mode. For the same devices, in the unknown mode, the maximum, minimum, and the average fell to 96%, 42%, and 72%, respectively. For the device type performance, the maximum, minimum, and the average recall values for both known and unknown test modes were significantly higher than that of device identification experiments. The average values were 88% and 77% for the known and unknown test modes, respectively.

TABLE III

|  |  | Device ID | | | | | Device Type | | | |
| --- | --- | --- | --- | --- | --- | --- | --- | --- | --- | --- |
|  |  | Known | | UnKnown | | | Known | | Unknown | |
|  |  | $\alpha$ | $\gamma$ | $\alpha$ | $\gamma$ |  | $\alpha$ | $\gamma$ | $\alpha$ | $\gamma$ |
|  | Dev |  |  |  |  | Type |  |  |  |  |
| Max | Netbook #5 | — | 0.99 | — | 0.96 | iPhone3 | — | 0.94 | — | 0.8 |
| Min | Iphone4 #2 | — | 0.56 | — | 0.42 | iPhone4 | — | 0.82 | — | 0.74 |
|  | Traffic Type |  |  |  |  | Traffic Type |  |  |  |  |
| Max | UDP 1400B 1 Mbps | 0.98 | 0.9 | 0.98 | 0.92 | UDP 1400B 1 Mbps | 0.99 | 0.99 | 0.92 | 0.86 |
| Min | SCP | 0.94 | 0.63 | 0.94 | 0.48 | SCP | 0.89 | 0.64 | 0.84 | 0.62 |
| Avg |  | 0.97 | 0.78 | 0.96 | 0.72 |  | 0.96 | 0.88 | 0.89 | 0.76 |

Results from Experiments on the Campus Network:

Experiments in a live network were conducted to determine the feasibility of the technique and provide bounds for the performance of our technique in realistic deployments. General results for the campus network testbed are summarized in Table IV. The device with the maximum $\gamma$ is AndroidPhone#2 with 70% while the device with the minimum $\gamma$ is Asus Tablet#2 with 32% and the average is 55% for the device identification analysis in the known operational mode. In the unknown mode of these devices, the maximum, minimum, and the average $\gamma$ fall to 58%, 24%, and 47%, respectively. On the other hand, for the device type performance the maximum, minimum, and the average recall values for both known and unknown test modes are significantly higher than that of device identification experiments. The average values are 81% and 65% for the known and unknown test modes, respectively.

TABLE IV

|  |  | Device ID | | | | | Device Type | | | |
| --- | --- | --- | --- | --- | --- | --- | --- | --- | --- | --- |
|  |  | Known | | UnKnown | | | Known | | Unknown | |
|  |  | $\alpha$ | $\gamma$ | $\alpha$ | $\gamma$ |  | $\alpha$ | $\gamma$ | $\alpha$ | $\gamma$ |
|  | Device |  |  |  |  | Device Type |  |  |  |  |
| Max | Google Ph 2 | — | 0.70 | — | 0.58 | eReader | — | 0.93 | — | 0.71 |
| Mn | Tablet 2 | — | 0.32 | — | 0.24 | Tablet | — | 0.67 | — | 0.57 |
|  | Test Type |  |  |  |  | Test Type |  |  |  |  |
| Max | Ping Req 1400b | 0.93 | 0.73 | 0.91 | 0.64 | SCP | 0.97 | 0.93 | 0.92 | 0.83 |
| Mn | TCP | 0.83 | 0.35 | 0.81 | 0.29 | UDP 1400B 8 Mbps | 0.66 | 0.49 | 0.67 | 0.48 |
| Avg |  | 0.87 | 0.55 | 0.85 | 0.47 |  | 0.88 | 0.81 | 0.80 | 0.65 |

Real-Time Implementation Discussion:

Two important factors that may affect time associated with an example implementation's decision process are capture time and processing time. The capture time depends at least partially on the data rate and number of packets needed (i.e., sample size) while the processing time depends at least partially on the algorithm and processing power. The time taken to perform the packet capture may increase linearly with an increase in sample size. However the processing time may increase at a slower rate. For example, when considering a sample size of 1K packets, the capture time for an 8 Mbps UDP flow was 1.18 s and the corresponding processing time was 0.0051 s or 4.14% of the capture time. When the capture size was increased to 50K packets, the corresponding processing time was 1.18 s or 1.58% of the capture time. The capture size used in this work was 2.5K packets, which had a capture time of 3.95 s and a corresponding processing time of 0.12 s or 2.95% of the capture time.

Thus, the example implementation tested was very lightweight (e.g., 0.12 s to make a decision) as a single-threaded application when the bottleneck was the capture time. At higher data rates, the processing time may start to become the performance bottleneck. To overcome this, an example implementation was made multi-threaded to process arriving packets in parallel. For example, when the data rate was 8 Mbps, for a sample size of 2.5K packets, the total processing time jumped to 11.49 s for a single-threaded example implementation. But, when 8 threads were used, the time was reduced to 6.67 s, resulting in a 45% speed up.

Attacker Models:

The effectiveness of an example implementation was considered under a number of attack scenarios. FIGS. 6A-D depict plots of inter-arrival time against probability density function for different attack scenarios, according to an example implementation. Given that the example implementation was IAT-based, a novice attacker with some knowledge of the detection technique might consider doing one of the following: (1) introduce constant/random delays to packet stream (see FIG. 6B); (2) vary the packet size (see FIG. 6A); (3) modify/change the operating system (see FIG. 6D); (4) load the CPU with intensive applications to over shadow normal behavior (see FIG. 6B); (5) tunnel packets through another protocol (see FIG. 6A). These attacks were carried out in an attempt to evade the example implementation. In the scenario, all the devices were assumed to be known. The example implementation detected these attacks and classified all of these devices that generated attack traffic from previously seen devices as unknown, which could be a red flag to a network administrator. The variation in the IAT distribution patterns (from normal) observed in FIGS. 6A, 6B, and 6D demonstrate why the example implementation was able to identify the attacker traffic.

Figure 6A:
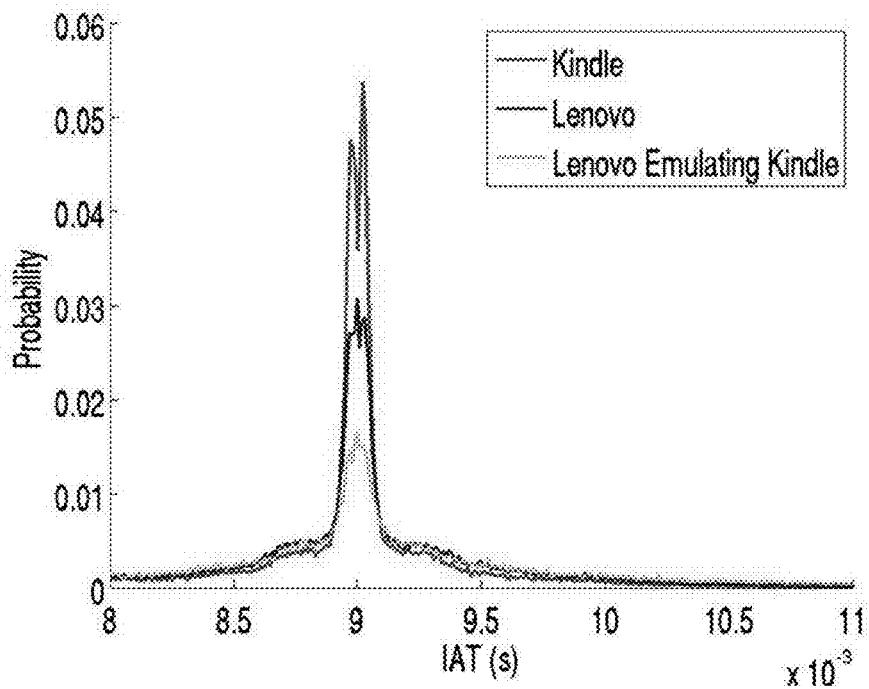
FIGS. 6A-D depict plots of inter-arrival time against probability density function for different attack scenarios, according to an example implementation.
Figure 6B:
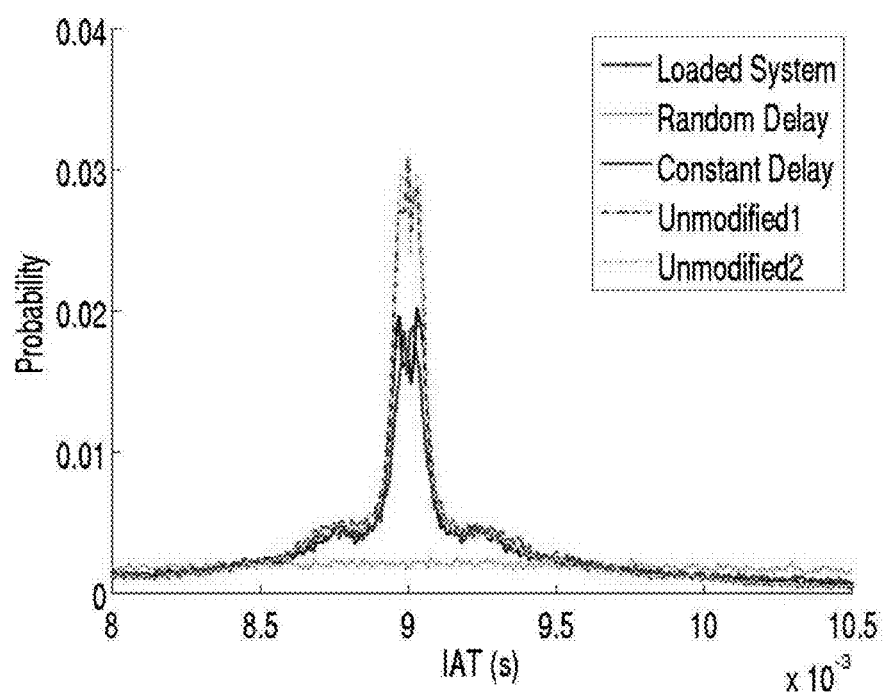
Figure 6C:
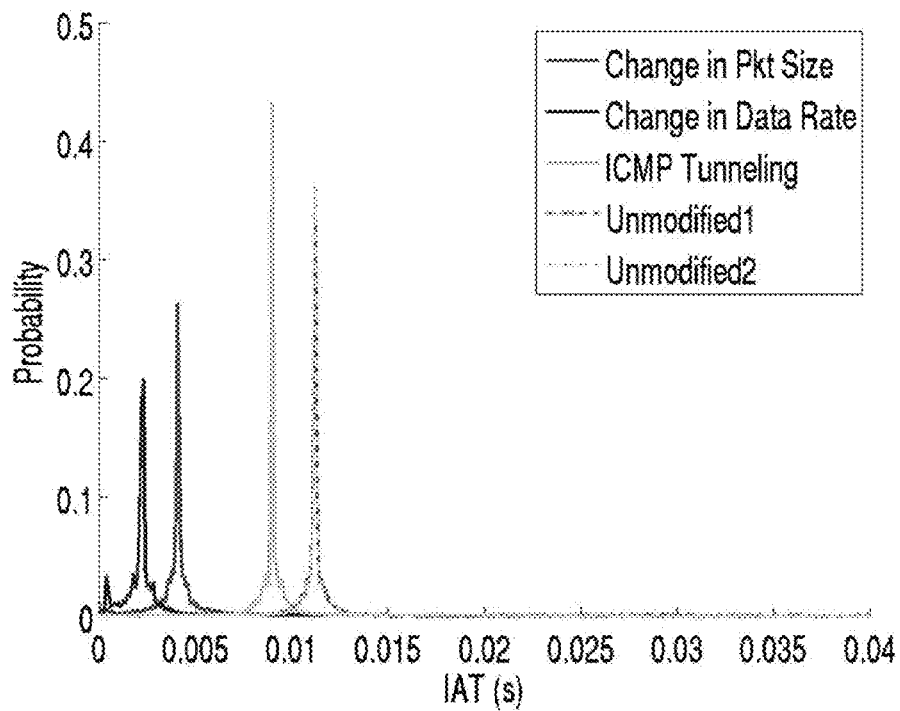
Figure 6D:
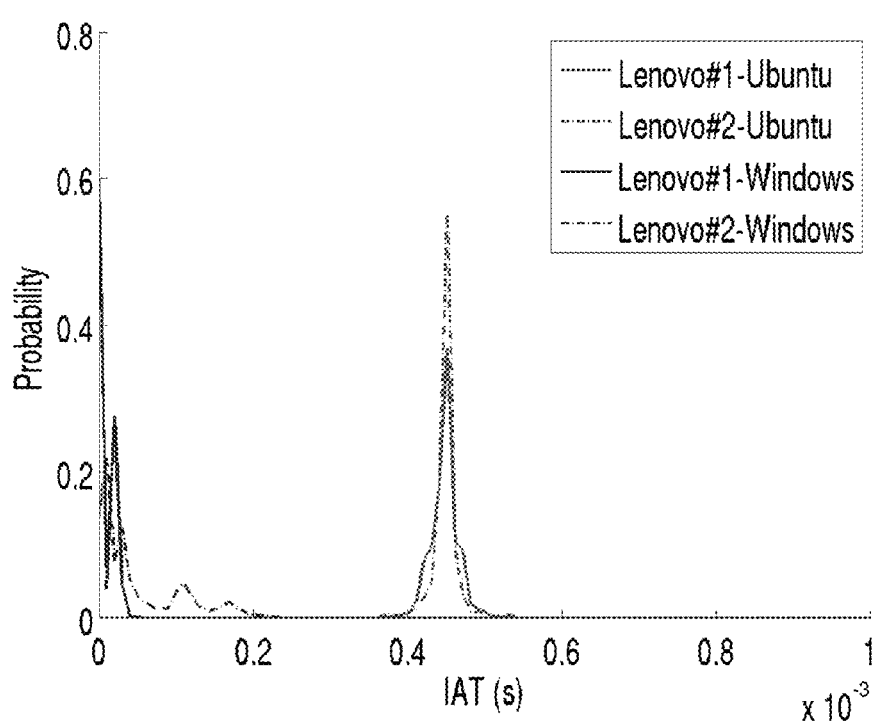

However, if an attacker is skilled and knowledgeable of the technique, he might attempt to emulate an authorized device in order to establish/maintain network access. To do so, the attacker would need the distribution of the difference in the IAT pattern of his device and the device that he desires to emulate. This information can be fed into a network emulation tool like netem (which is a part of linux kernel 2.6 and higher) to transmit packets in accordance with the distribution. When such an attack is performed, one might expect the attacker's device to be classified as a known device. However, that was not the case. FIG. 6C shows the IAT distribution when the Lenovo laptop attempted to behave like a Kindle. Clearly, the distribution of the emulated traffic was different from the actual and the targeted device and the example implementation labeled this traffic as unknown. Also, the IATs were observed to be more distributed when compared to the unaltered device. One of the primary factors that prevented an accurate emulation is the fact that the attacker's device had to simultaneously spoof a signature of a device and attempt to hide its innate signature. As discussed previously, one of the underlying theories behind the disclosed technology is that different devices essentially "talk" differently (i.e., they have a different cadence), thus, as illustrated by the experimental results, it is difficult for even a more powerful device to emulate the traffic distribution of a less powerful device.

Figure 8:
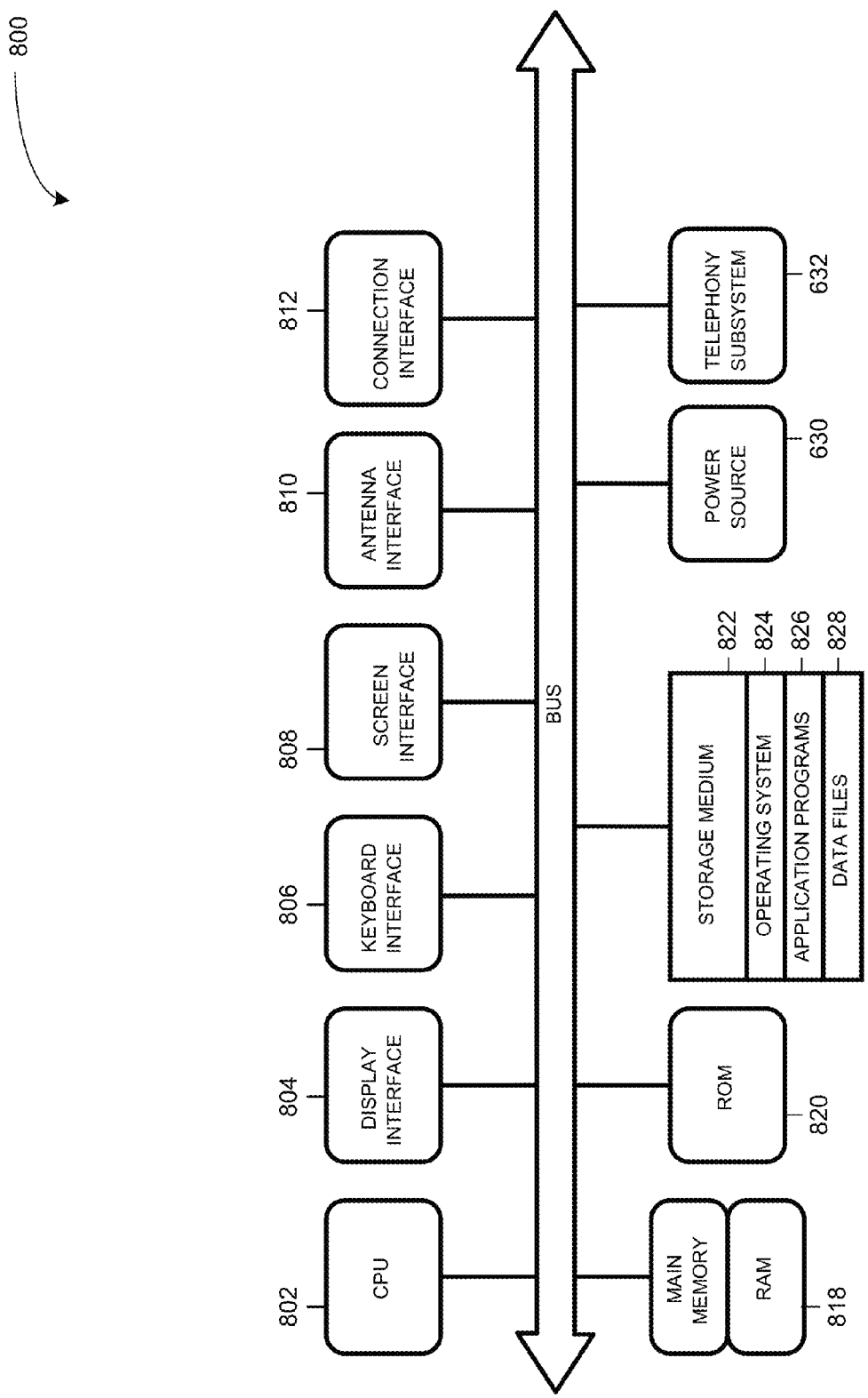
FIG. 8 depicts an illustrative block diagram of a computing device system architecture, according to an example implementation.

FIG. 8 depicts a block diagram of an illustrative computer system architecture 800 according to an example implementation. Certain aspects of FIG. 8 may be embodied in a computing device. Various implementations and methods herein may be embodied in non-transitory computer readable media for execution by a processor. It will be understood that the architecture 800 is provided for example purposes only and does not limit the scope of the various implementations of the communication systems and methods.

The architecture 800 of FIG. 8 includes a central processing unit (CPU) 802, where computer instructions are processed; a display interface 804 that acts as a communication interface and provides functions for rendering video, graphics, images, and texts on the display; a keyboard interface 806 that provides a communication interface to a keyboard; and a pointing device interface 808 that provides a communication interface to a pointing device, e.g., a touchscreen or presence-sensitive screen. Example implementations of the architecture 800 may include an antenna interface 810 that provides a communication interface to an antenna. Example implementations may include a connection interface 812. The connection interface may include one or more of a peripheral connection interface and network communication interface, providing a communication interface to an external device or network. According to example implementations, a random access memory (RAM) 818 may be provided, where computer instructions and data may be stored in a volatile memory device for processing by the CPU 802.

According to an example implementation, the architecture 800 may include a read-only memory (ROM) 820 where invariant low-level system code or data for basic system functions such as basic input and output (I/O), startup, or reception of keystrokes from a keyboard are stored in a non-volatile memory device. According to an example implementation, the architecture 800 may include a storage medium 822 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 824, application programs 826 (including, for example, a web browser application, a widget or gadget engine, and or other applications, as necessary) and data files 828 are stored. According to an example implementation, the architecture 800 may include a power source 830 that provides an appropriate alternating current (AC) or direct current (DC) to power components. According to an example implementation, the architecture 800 may include a telephony subsystem 832 that allows the device 800 to transmit and receive sound over a telephone network. The constituent devices and the CPU 802 may communicate with each other over a bus 834.

In accordance with an example implementation, the CPU 802 may have appropriate structure to be a computer processor. In one arrangement, the computer CPU 802 may include more than one processing unit. The RAM 818 may interface with the computer bus 834 to provide quick RAM storage to the CPU 802 during the execution of computing programs such as the operating system application programs, and device drivers. More specifically, the CPU 802 may load computer-executable process steps from the storage medium 822 or other media into a field of the RAM 818 in order to execute computing programs. Data may be stored in the RAM 818, where the data may be accessed by the computer CPU 802 during execution. In one example configuration, the device 800 may include at least 128 MB of RAM, and 256 MB of flash memory.

The storage medium 822 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media may allow the device 800 to access computer-executable process steps, application programs and the like, stored on removable and non-removable memory media, to off-load data from the device 800 or to upload data onto the device 800. A computer program product, such as one utilizing a communication system may be tangibly embodied in storage medium 822, which may comprise a machine-readable storage medium.

In an example implementation of the disclosed technology, the mobile computing device computing system architecture 800 may include any number of hardware and/or software applications that are executed to facilitate any of the operations. In an example implementation, one or more I/O interfaces may facilitate communication between the mobile device computing system architecture 800 and one or more input/output devices. For example, a universal serial bus port, a serial port, a disk drive, a CD-ROM drive, and/or one or more user interface devices, such as a display, keyboard, keypad, mouse, control panel, touchscreen display, microphone, etc., may facilitate user interaction with the mobile device computing system architecture 800. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the mobile device computing system architecture 800 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, a proximity network, etc., for communication with external devices and/or systems. As desired, implementations of the disclosed technology may include the mobile device computing system architecture 800 with more or less of the components illustrated in FIG. 8.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
capturing, at a listening node in communication with a network, network traffic originating from a first device in communication with the network and routed to a destination node in communication with the network;
measuring, independent of network traffic type, protocol or packet payload, one or more traffic properties of the captured network traffic;
generating a feature vector based on at least a portion of the one or more measured traffic properties;
analyzing one or more statistical properties of the feature vector; and
generating a first device signature based on the analyzed one or more statistical properties, wherein the first device signature comprises encoded information about a hardware and software architecture of the first device;
comparing the first device signature with one or more known signatures; and
determining, based on the comparing, and without prior knowledge of the network traffic type, protocol or packet payload, a type of the first device and an identity of the first device.

2. The method of claim 1 further comprising determining an identity of a second device, wherein:
the identity of the first device is determined to be a first unknown device;
the identity of the second device is determined to be a second unknown device; and
the first unknown device and second unknown device are determined to be different devices.

3. The method of claim 1, wherein the first device is in wireless communication with the network and the network traffic is routed over a wired segment to reach the destination node, and wherein the listening node captures the network traffic from the wired segment.

4. The method of claim 1, wherein the captured network traffic is at least partially encrypted.

5. The method of claim 1, wherein the network comprises network access control and the first device does not comprise a network access control client compatible with the network access control.

6. The method of claim 1, wherein the network traffic is passively captured.

7. The method of claim 1, wherein the measured traffic properties comprise packet inter-arrival time.

8. The method of claim 1, wherein the feature vector is a time series of measured values.

9. A computer-readable medium that stores instructions that, when executed by at least one processor in a system, cause the system to perform a method comprising:
receiving, at a listening node in communication with a network, packets routed from a first device in communication with the network and routed to a destination node in communication with the network;
determining, independent of network traffic type, protocol or packet payload, one or more traffic properties of the received packets;
generating a feature vector based on at least a portion of the one or more determined traffic properties;
analyzing one or more statistical properties of the feature vector; and
generating a first device signature based on the analyzed one or more statistical properties, wherein the first device signature comprises encoded information about a hardware and software architecture of the first device;
comparing the first device signature with one or more known signatures; and
determining, based on the comparing, and without prior knowledge of the network traffic type, protocol or packet payload, a type of the first device and an identity of the first device.

10. The method of claim 9 further comprising determining a type of a second device, wherein:
the type of the first device is determined to be a first unknown device type;
the type of the second device is determined to be a second unknown device type; and
the first unknown device type and second unknown device type are determined to be different device types.

11. The method of claim 9, wherein the first device is in wireless communication with the network and the listening node is in wireless communication with the network.

12. The method of claim 9 further comprising sending data to the first device intended to prompt the sending of one or more packets from the first device for capture at the listening node.

13. The method of claim 9, wherein the determined traffic properties comprise packet round-trip time.

14. A method comprising:
capturing, passively by a listening node in wired communication with a network, network traffic originating from a first device in wireless communication with the network, the network traffic routed over a wired segment to arrive at a destination node in communication with the network, wherein the listening node captures the network traffic from the wired segment;
measuring, independent of network traffic type, protocol or packet payload, one or more traffic properties including packet inter-arrival times of the captured network traffic;
generating a feature vector based on at least the one or more traffic properties;
analyzing one or more statistical properties of the feature vector;
generating a first device signature based on the analyzed one or more statistical properties, wherein the first device signature comprises encoded information about the hardware and software architecture of the first device;
comparing the first device signature with one or more known signatures; and
determining, based on the comparing, and without prior knowledge of network traffic type, protocol or packet payload, a type of the first device and an identity of the first device.

* * * * *